United States Patent
Compton et al.

(10) Patent No.: US 8,829,423 B2
(45) Date of Patent: Sep. 9, 2014

(54) FOLDED OPTICS FOR BATCH FABRICATED ATOMIC SENSOR

(71) Applicant: Honeywell International Inc., Morristown, NJ (US)

(72) Inventors: Robert Compton, Plymouth, MN (US); Robert D. Horning, Savage, MN (US); Jeff A. Ridley, Shorewood, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 13/663,057

(22) Filed: Oct. 29, 2012

(65) Prior Publication Data

US 2014/0014826 A1    Jan. 16, 2014

Related U.S. Application Data

(60) Provisional application No. 61/670,766, filed on Jul. 12, 2012.

(51) Int. Cl.
*H05H 3/02* (2006.01)
*H05H 3/00* (2006.01)

(52) U.S. Cl.
USPC .......................................................... 250/251

(58) Field of Classification Search
USPC .......................................................... 250/251
See application file for complete search history.

(56) References Cited

U.S. PATENT DOCUMENTS

| | | | | |
|---|---|---|---|---|
| 5,528,028 | A * | 6/1996 | Chu et al. ...................... | 250/251 |
| 6,900,702 | B2 | 5/2005 | Youngner et al. | |
| 7,965,147 | B2 | 6/2011 | Strabley et al. | |
| 2009/0251224 | A1 | 10/2009 | DeNatale et al. | |
| 2010/0207016 | A1* | 8/2010 | McBride et al. ............. | 250/251 |

* cited by examiner

*Primary Examiner* — Nicole Ippolito
*Assistant Examiner* — Hanway Chang
(74) *Attorney, Agent, or Firm* — Fogg & Powers LLC (57) ABSTRACT

System and methods for a vacuum cell apparatus for an atomic sensor are provided. In at least one embodiment, the apparatus comprises a cell wall encircling an enclosed volume, the cell wall having a first open end and a second open end opposite from the first open end and a first panel over the first open end of the cell wall and having a first surface, the first surface facing the enclosed volume and having a first set of diffractive optics therein. Further, the apparatus comprises a second panel over the second open end of the cell wall and having a second surface, the second surface facing the enclosed volume and having a second set of diffractive optics therein; wherein the first set of diffractive optics and the second of diffractive optics are configured to reflect at least one optical beam within the enclosed volume along a predetermined optical path.

20 Claims, 7 Drawing Sheets

FOLDED OPTICS FOR BATCH FABRICATED ATOMIC SENSOR

CROSS REFERENCE TO RELATED APPLICATION

This application claims the benefit of priority to U.S. Provisional Application No. 61/670,766, filed on Jul. 12, 2012, the disclosure of which is incorporated herein by reference.

BACKGROUND

Laser cooled atoms are the basis for a class of precision sensors, including precision clocks, magnetometers, gyroscopes, and accelerometers. Frequently, cold atom sensors include large vacuum chambers that isolate the atoms from the ambient environment and provide a platform for mounting lasers and optics to the body of the cold atom sensor. Recent efforts to miniaturize cold atom sensors have made progress in reducing size, but are based on physics packages that require traditional machining processes which are slow and costly.

SUMMARY

System and methods for a vacuum cell apparatus for an atomic sensor are provided. In at least one embodiment, the apparatus comprises a cell wall encircling an enclosed volume, the cell wall having a first open end and a second open end opposite from the first open end and a first panel over the first open end of the cell wall and having a first surface, the first surface facing the enclosed volume and having a first set of diffractive optics therein. Further, the apparatus comprises a second panel over the second open end of the cell wall and having a second surface, the second surface facing the enclosed volume and having a second set of diffractive optics therein; wherein the first set of diffractive optics and the second of diffractive optics are configured to reflect at least one optical beam within the enclosed volume along a predetermined optical path.

DRAWINGS

Understanding that the drawings depict only exemplary embodiments and are not therefore to be considered limiting in scope, the exemplary embodiments will be described with additional specificity and detail through the use of the accompanying drawings, in which:

FIGS. 5A-5H illustrate the batch fabrication of an atomic sensor having folded optics according to one embodiment.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. It is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Systems and methods for a batch fabricated atomic sensor are provided. As described below, certain atomic sensors function by isolating atoms within a vacuum and measuring characteristics of the atoms. For example, measured vibrations of the isolated atoms can be used as a reference frequency in a timing system. As described in the present disclosure, atoms are isolated within a vacuum cell that can be batch fabricated. For example, a batch fabricated vacuum package includes a hollow cell capped by layers of planar glass. Laser light is coupled into the package by, for example, an optical fiber. A set of diffractive optics is disposed upon the inner surface of the glass. The laser beam expands as it bounces against the inner surfaces of the chamber, then is collimated just before passing through the region where atoms are trapped. In at least one embodiment, three such beams intersect at ninety degree angles to trap and cool the atoms. The beams can also be used to manipulate and interrogate the atoms for purposes of creating an atomic sensor.

Figure 1:
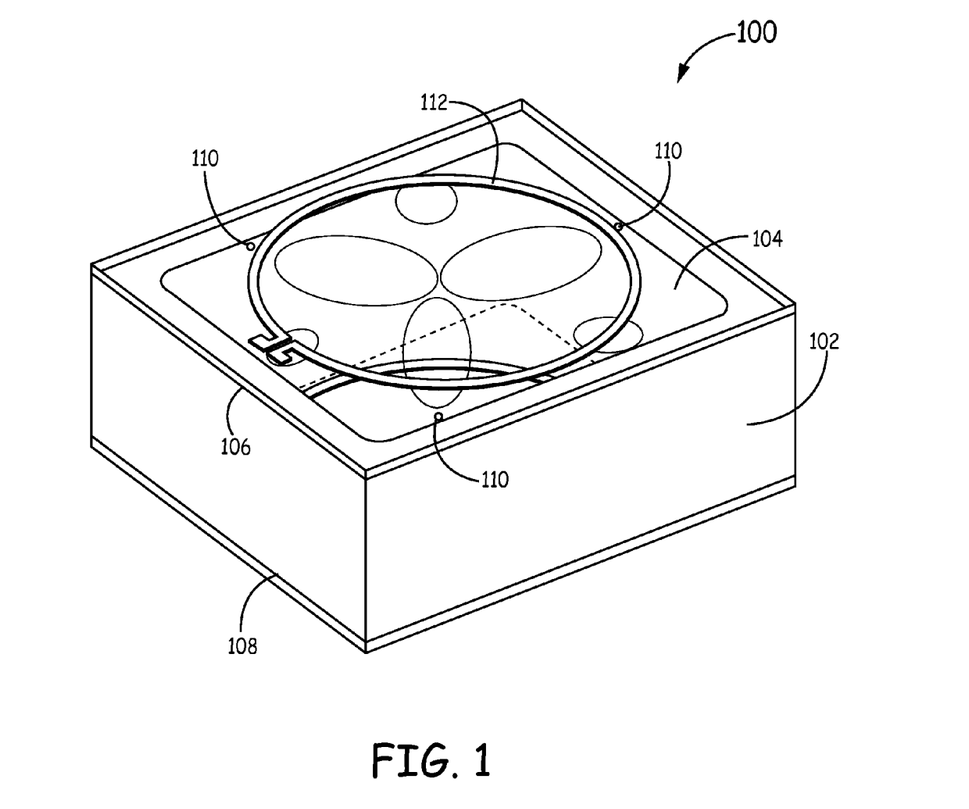
FIG. 1 is a perspective view of a vacuum cell for an atomic sensor according to one embodiment.

FIG. 1 is a diagram of a batch fabricated vacuum cell 100 for an atomic sensor. Vacuum cell 100 includes a cell wall 102. Cell wall 102 is a part of a rigid body that includes an enclosed volume 104 where the enclosed volume 104 is encircled by the cell wall 102. Cell wall 102 can be fabricated from silicon, glass, or other rigid material. To further define the vacuum cell 100, a first panel 106 and a second panel 108 are joined to cell wall 102 on opposite ends of the enclosed volume 104 such that the enclosed volume 104 enclosed by the combination of the first panel 106, the second panel 108 and the cell wall 102 is airtight. For example, the cell wall 102 has a first open end and a second open end on opposite sides of the cell wall 102. The first panel 106 is joined to the first open end and the second panel 108 is joined to the second open end to surround the enclosed volume 104 and form an airtight interior space. In at least one embodiment, the first panel 106 and the second panel 108 are made from glass or other transparent material. In one implementation, where the cell wall 102 is fabricated from silicon and the first panel 106 and the second panel 108 are glass panels, the first panel 106 and the second panel 108 are anodically bonded to the cell wall 102 at opposite ends of the enclosed volume 104. Alternatively, when the cell wall 102 is fabricated from glass and the first panel 106 and the second panel 108 are fabricated from glass, a frit seal can bond the first panel 106 and the second panel 108 to the cell wall 102. Other methods can also bond the first panel 106 and second panel 108 to the cell wall 102, such as an adhesive, or the like.

In certain embodiments, the enclosed volume 104 defined by the cell wall 102, the first panel 106, and the second panel 108 functions as a vacuum package for a cold atom sensor. When the vacuum cell 100 functions as part of a cold atom sensor, the enclosed volume 104 contains atoms that are cooled by laser light that is introduced into the enclosed volume 104. To introduce the light into the enclosed volume 104, the light is introduced at one of a plurality of light ports 110. In certain embodiments, light ports 110 are arranged such that light introduced into the enclosed volume 104 at light ports 110 will intersect each other at ninety degree angles. Light can be introduced through light ports 110 by emitting a laser light from a fiber optic cable coupled to the light ports on the first panel 106. In an alternative embodiment, light is also coupled through light ports located on the second panel 108. When light is introduced through both the first panel 106 and the second panel 108, each beam of light introduced through the first panel 106 has a corresponding beam of light introduced through the second panel 108 that propagates along the same beam path but in an opposite direction.

In a further embodiment, a magnetic coil 112 is formed on the surface of the first panel 106, where the surface of the first panel 106 that contacts the magnetic coil 112 is on the external surface of the vacuum cell 100. Also, in some implementations, a similar magnetic coil is formed on the external surface of the second panel 108. In some implementations, the magnetic coil 112 functions to form a minimum magnetic field (like an anti-Helmholtz field) at the location where the light beams introduced through light ports 110 intersect. The minimum magnetic field directs atoms within the enclosed volume 104 to the location where the light beams intersect so that the atoms can be cooled and trapped by the light beams. The trapped atoms can then be monitored as part of a precision clock, a magnetometer, a gyroscope, an accelerometer, and the like. For example, light beams introduced through the first panel 106 and the second panel 108 can interrogate the atoms to gather information from the sensor. Further, a photo detector can be mounted near the vacuum cell 100 to aid in detection.

Figure 2:
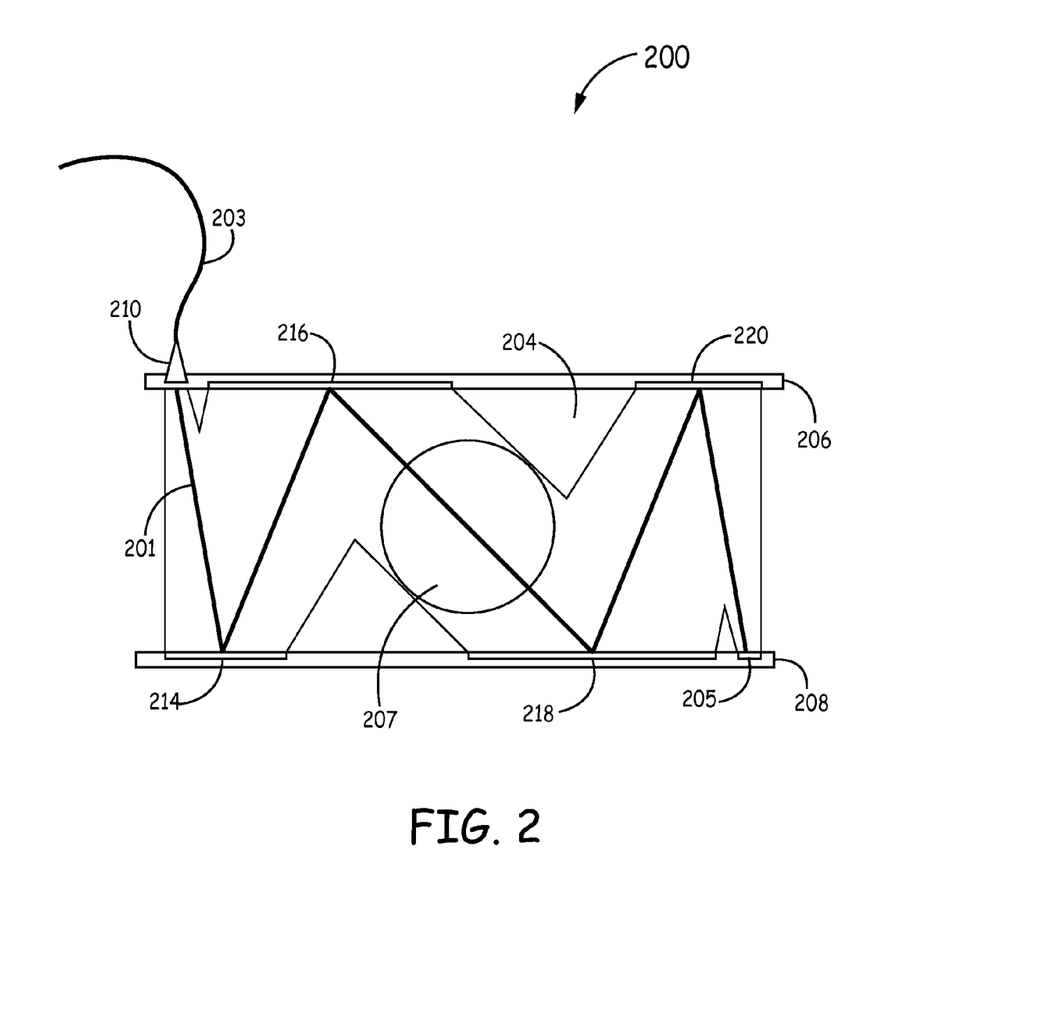
FIG. 2 is a side view of a vacuum cell showing a single folded optical beam and accompanying optics according to one embodiment.

FIG. 2 is a diagram of a vacuum cell 200 with a single folded optical beam 201 propagating through an enclosed volume 204 and accompanying optics formed on an internal surface of a first panel 206 and the second panel 208. In at least one embodiment, enclosed volume 204 functions as enclosed volume 104 in FIG. 1. Likewise, in at least one embodiment, the first panel 206 and the second panel 208 function as first panel 106 and second panel 108. Also, light port 210 can function as light port 110 in certain embodiments. As illustrated in FIG. 2, folded optical beam 201 is introduced into the enclosed volume 204 through the light port 210 on the first panel 206, where the light port 210 is coupled to a light source 203. The light source 203 can be a laser, a fiber optic cable, or other source of light or light transmission medium.

In certain embodiments, when the optical beam 201 is emitted through light port 210 into the enclosed volume 204, the optical beam 201 reflects off of surfaces on the first panel 206 and the second panel 208 to form the folded optical beam 201. Further, portions of the internal surface of the first panel 206 and the second panel 208 that are contacted by the folded optical beam 201 are configured with diffractive optics 214, 216, 218, and 220. The diffractive optics 214, 216, 218, and 220 are portions on the internal surface of the first panel 206 and second panel 208 that diffract and change the rate at which the folded optical beam 201 expands as the folded optical beam 201 propagates through the enclosed volume 204. For example, the diffractive optics include mirrors that reflect light, collimating optical surfaces that reflect parallel beams of light, quarter wave plates, and the like. The diffractive optics 214, 216, 218, and 220 also reflect the folded optical beam 201 within the enclosed volume 204. For example, the optical beam 201 is introduced into enclosed volume 204, whereupon the optical beam 201 becomes incident on diffractive optic 214. Diffractive optic 214 causes the optical beam 201 to expand more rapidly and reflects the folded optical beam 201 towards diffractive optic 216. The expanding optical beam 201 reflects off of diffractive optic 214, propagates through enclosed volume 204, and becomes incident on diffractive optic 216. Diffractive optic 216 collimates the optical beam 201 such that the photons in folded optical beam 201 are traveling parallel to one another. Further, the diffractive optic 216 directs the collimated light beam 201 onto atoms 207 to cool and trap the atoms 207 at a location within the enclosed volume 204. The collimated optical beam 201 is then incident on diffractive optic 218. Diffractive optic 218 causes the optical beam 201 to begin to narrow and reflects the optical beam 201 to diffractive optic 220. Similar to diffractive optic 218, diffractive optic 220 causes the optical beam 201 to further narrow and reflects the optical beam 201 to a surface 205.

In certain embodiments, surface 205 is a combination of a quarter waveplate and a mirror. When surface 205 is a quarter wave plate/mirror combination, light passes through the quarter wave plate and reflects off the mirror and again passes through the quarter wave plate. The quarter wave plate/mirror combination changes the polarization of the folded optical beam 201 and reflects the folded optical beam 201 back through enclosed volume 204 off of diffractive optics 220, 218, 216, and 214 such that the reverse traveling folded optical beam 201 travels along the same path and at the same beam width as the forward traveling folded optical beam 201, except the reverse traveling and forward traveling folded optical beams 201 travel in different directions. In at least one alternative embodiment, surface 205 functions as a light port on the second panel 208. When surface 205 is a light port, a reverse traveling folded optical beam 201 is introduced into the enclosed volume 204 from a second light source. When the reverse traveling folded optical beam 201 is introduced through a light port, the reverse traveling folded optical beam 201 travels along the same path and at the same beam width as the forward traveling folded optical beam 201 except the reverse traveling and forward traveling folded optical beams 201 travel in different directions. The reverse and forward traveling optical beams 201 aid in trapping and cooling atoms located at the center of the enclosed volume 204.

Figure 3:
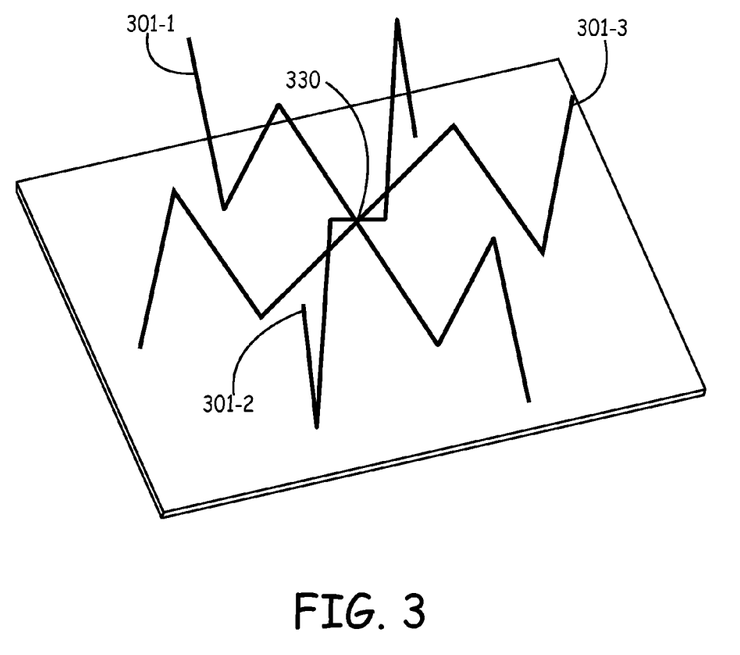
FIG. 3 is a diagram of the intersection of multiple folded optical beams according to one embodiment.

FIG. 3 is a diagram of the intersection of multiple folded optical beams 301-1-301-3 propagating within an enclosed volume. In at least one implementation, each folded optical beam 301-1-301-3 propagates similarly to folded optical beam 201 in FIG. 2 along with the accompanying diffractive optics 214, 216, 218, and 220. However, the folded optical beams 301-1-301-3 are introduced into an enclosed volume at different locations such that the folded optical beams 301-1-301-3 simultaneously intersect one another at an intersection point 330, where the folded optical beams 301-1-301-3 are propagating in orthogonal directions at the intersection point 330 within the enclosed volume. In certain exemplary embodiments, atoms are placed at the intersection point 330, where the folded optical beams 301-1-301-3 trap and cool the atoms.

Figure 4A:
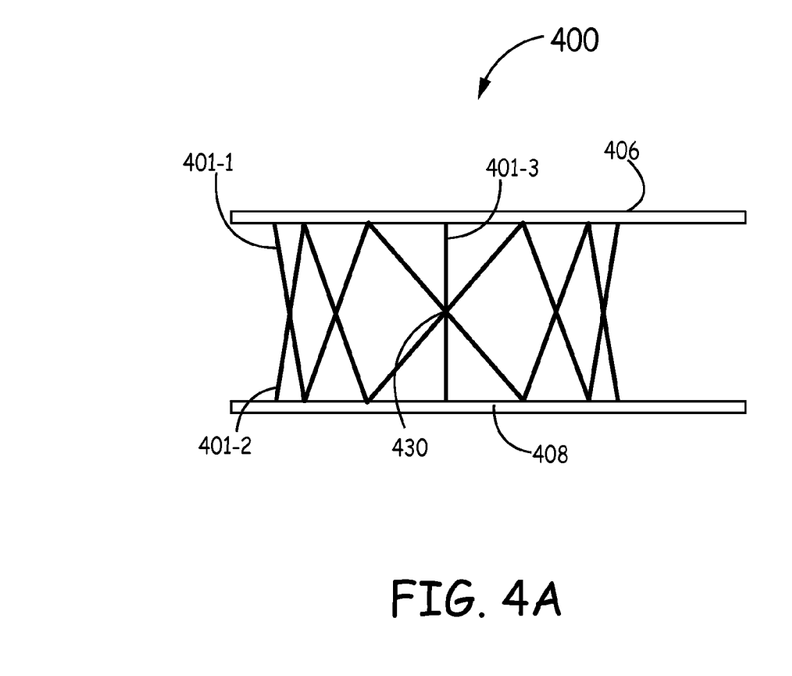
FIGS. 4A and 4B are side views of the intersection of multiple folded optical beams according to one embodiment.
Figure 4B:
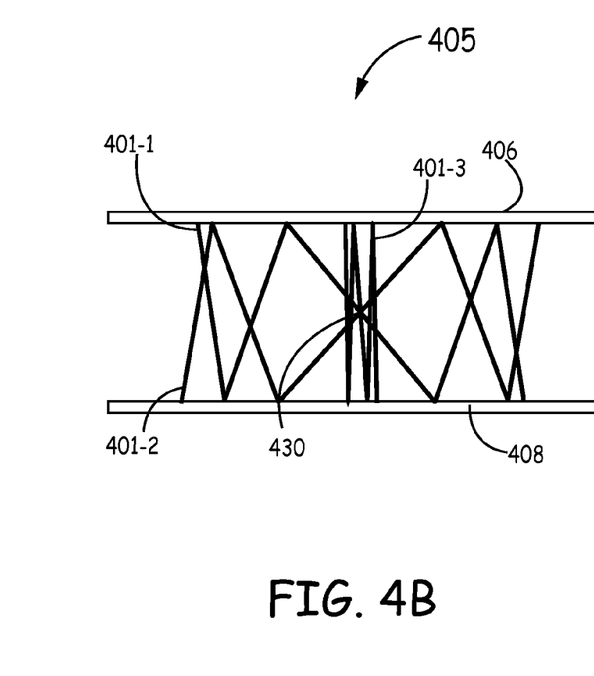

FIGS. 4A and 4B are diagrams of a first side view 400 and second side view 405 of the intersection of multiple folded optical beams 401-1-401-3. In at least one embodiment, multiple folded optical beams 401-1-401-3 function as multiple folded optical beams 301-1-301-3 in FIG. 3. As shown in the first side view 400 in FIG. 4A, the multiple folded optical beams 401-1-401-3 are reflected between a first planar surface 406 and a second planar surface 408, where, in some implementations, the first panel 406 and the second panel 408 function as the first panel 106 and the second panel 108 in FIG. 1. As the multiple folded beams 401-1-401-3 are reflected between the first panel 406 and the second panel 408, the multiple folded beams 401-1-401-3 intersect at an intersection point 430, where intersection point 430 is similar to intersection point 330 in FIG. 3. The second side view 405 in FIG. 4B of the multiple folded optical beams 401-1-401-3 shows the multiple folded optical beams at a different angle to show more clearly how the multiple folded optical beams 401-1-401-3 intersect each other at the intersection point 430. In certain exemplary embodiments, atoms are placed at the intersection point 430, where the multiple folded optical beams 401-1-401-3 trap and cool the atoms.

Figure 5A:
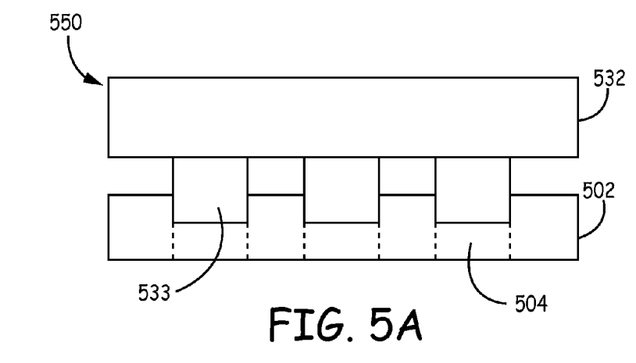

FIGS. 5A-5H illustrate one exemplary batch process for fabricating atomic sensors having folded optics. In certain embodiments as shown in FIG. 5A at 550, enclosed volumes 504 are formed within a rigid body such as an opaque wafer 502, which can be composed of silicon, for example. In certain embodiments, the wafer 502 has a thickness on the order of a centimeter and to form the multiple enclosed volumes 504 within the wafer 502, an ultrasonic machine tool 532 is used. The ultrasonic machine tool 532 has multiple teeth 533 that each separately correspond to a different enclosed volume 504 to be formed within the wafer 502. The ultrasonic machine tool 532 vibrates the multiple teeth 533 at ultrasonic speeds in the presence of a slurry against a surface of the wafer 502. The multiple teeth 533 are abrasive and wear away portions of the surface of the wafer 502 to form the multiple enclosed volumes 504. In an alternative embodiment, the multiple enclosed volumes 504 are formed through deep reactive ion etching in the surface of the wafer 502.

Figure 5B:
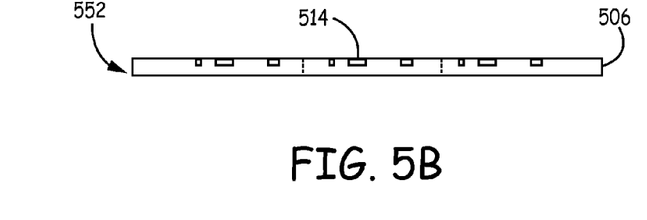

As depicted in FIG. 5B, at 552, diffractive optics 514 are formed in the surface of a first transparent panel 506, such as a glass wafer. In at least one embodiment, the diffractive optics 514 are blazed into the panel 506 through standard photo-lithography procedures. In some exemplary implementations, the diffractive optics 514 function as diffractive optics 214, 216, 218, and 220 in FIG. 2.

Figure 5C:
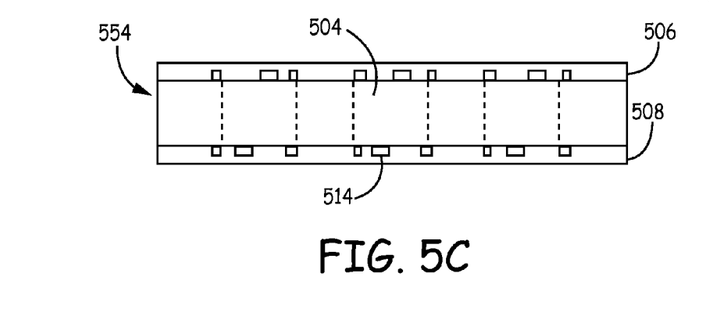

Further, as shown in FIG. 5C at 554, the first transparent panel 506 and a second transparent panel 508 are bonded to the wafer 502, as shown in FIG. 5C. The panel 508 is formed in the same fashion as previously described for panel 506. Thus, both of panels 506 and 508 have diffractive optics 514 etched into their respective surfaces that face wafer 502. The surfaces of panels 506 and 508 that have the diffractive optics 514 are bonded to the wafer 502 using anodic bonding, where the panels 506 and 508 are bonded to opposite sides of the wafer 502. In an alternative embodiment, where wafer 502 is fabricated from glass instead of silicon, the panels 506 and 508 are bonded to the wafer 502 using a frit seal. Either the frit seal or the anodic bond provides an airtight seal for the enclosed volume 504. In certain embodiments, the panels 506 and 508 are sealed to the wafer 502 in a vacuum environment to seal a vacuum within the enclosed volume 504.

Figure 5D:
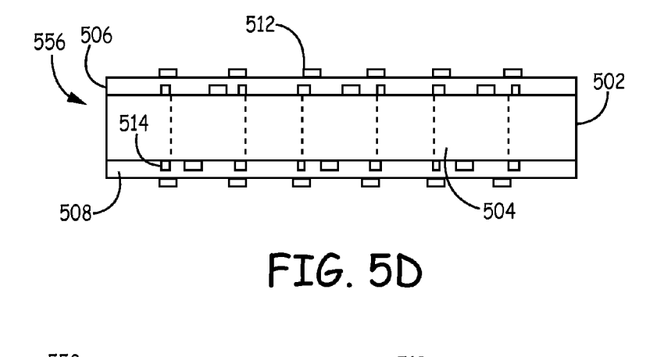

As shown in FIG. 5D at 556, magnetic coils 512 are formed on the outer surfaces of panels 506 and 508 that are not bonded to the wafer 502. In certain embodiments, the magnetic coils 512 function as magnetic coil 112 in FIG. 1.

Figure 5E:
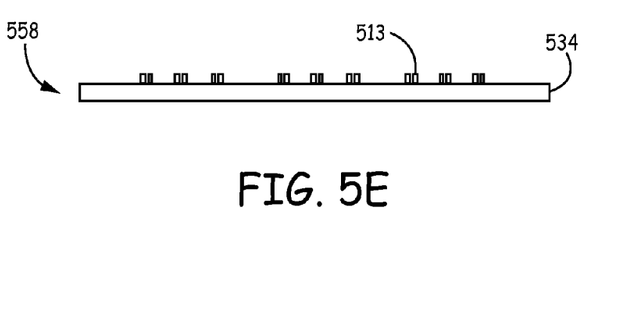
Figure 5F:
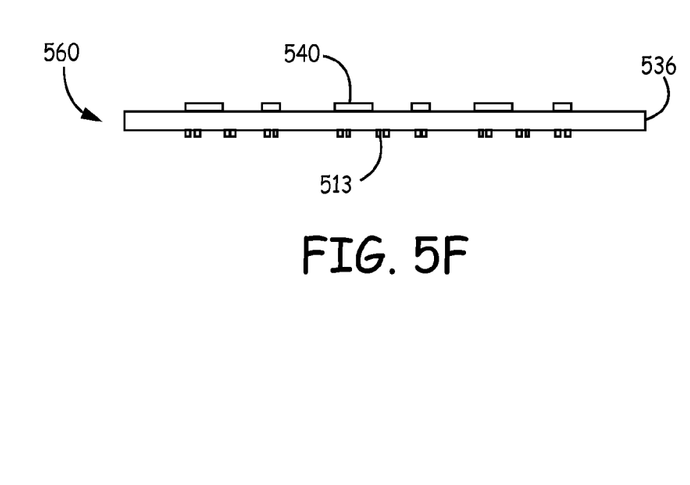

At 558 in FIG. 5E, a first overlayer 534 is fabricated. The first overlayer 534 protects the atomic sensor and provides an interface for physically connecting the atomic sensor to other devices. In certain embodiments, the first overlayer 534 is fabricated from silicon, or other rigid material. During the fabrication of the first overlayer 534, supplementary magnetic coils 513 can be deposited on the first overlayer 534. In at least one implementation, a second overlayer 536 is also fabricated, such as shown in FIG. 5F at 560. In at least one example, first overlayer 534 and second overlayer 536 are fabricated using similar fabrication processes. Alternatively, the first overlayer 534 and the second overlayer 536 are fabricated using different processes.

In one example, first overlayer 534 and second overlayer 536 can both be fabricated to include the supplementary magnetic coils 513. As depicted in FIG. 5F, second overlayer 536 can be further fabricated to include a metallization layer 540 on the opposite side of the second overlayer 536 from the side that contains supplementary magnetic coils 513. The metallization layer 540 functions as a support for MEMS sensors that can be attached to the atomic sensor containing the enclosed volume 504.

Figure 5G:
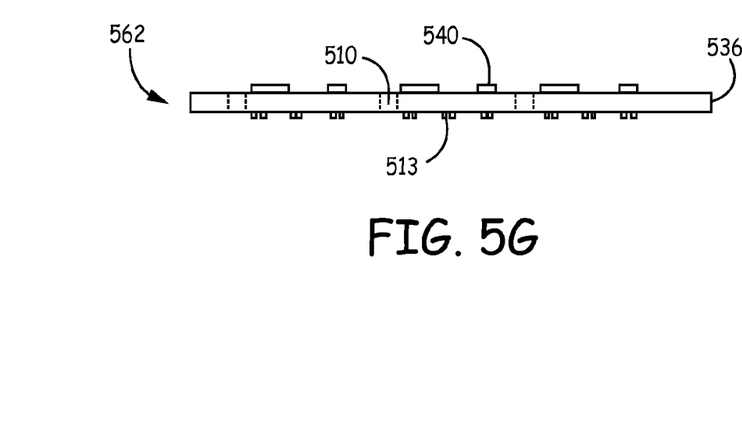

As illustrated in FIG. 5G at 562, the second overlayer 536 has light ports 510 formed therein. In at least one embodiment, the light ports 510 are formed through deep reactive ion etching or other method that can form the light ports 510. In certain implementations, the light ports 510 function as light ports 110 in FIG. 1. In an alternative embodiment, the first overlayer 534 also has light ports formed therein and/or a metallization layer formed thereon similar to second overlayer 536.

Figure 5H:
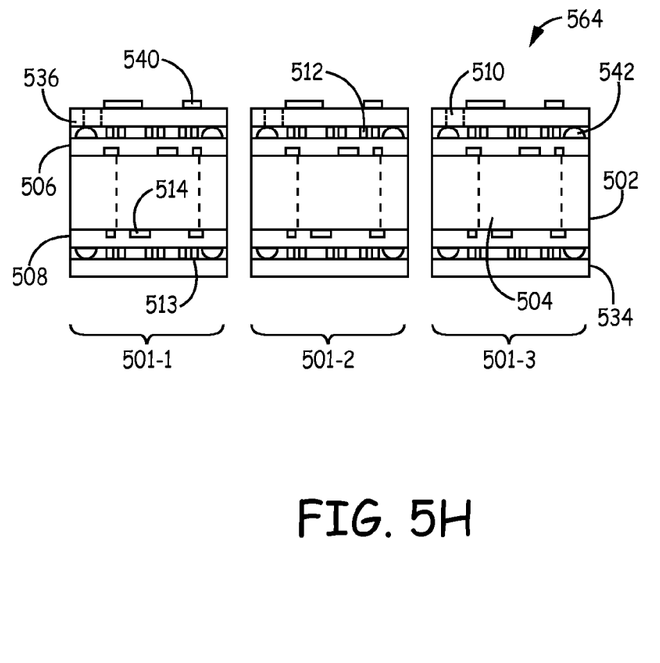

At 564 in FIG. 5H, the first overlayer 534, the second overlayer 536, and the combination of the panel 506, the panel 508, and the wafer 502, are singulated into separate components that are each associated with a particular atomic sensor 501-1, 501-2, and 501-3. For example, the singulation is performed by dicing, sawing, and the like. When the different components have been singulated the first overlayer 534 and the second overlayer 536 are bonded to the singulated and bonded combinations of the panel 506, the panel 508 and the wafer 502 that correspond to individual atomic sensors 501-1-501-3. For example, a singulated portion of the first overlayer 534 is bonded to a singulated panel 508 and a singulated portion of the second overlayer 536 is bonded to a singulated panel 506. In at least one embodiment, the first overlayer 534 and the second overlayer 536 are bonded through thermocompression, which bonds the surface of the singulated first overlayer 534 and the singulated second overlayer 536 that contains the supplementary magnetic coils 513 to the surface of the singulated panel 506 and the singulated panel 508 that contains the magnetic coils 512. In at least one embodiment, the thermocompression bonds different surfaces to one another through stud bumps 542, which bonds surfaces together through the application of pressure and heat. The bonding of the singulated first overlayer 534 and the singulated second overlayer 536 to the singulated panels 506 and 508 form batch fabricated individual atomic sensors 501-1-501-3.

Figure 6:
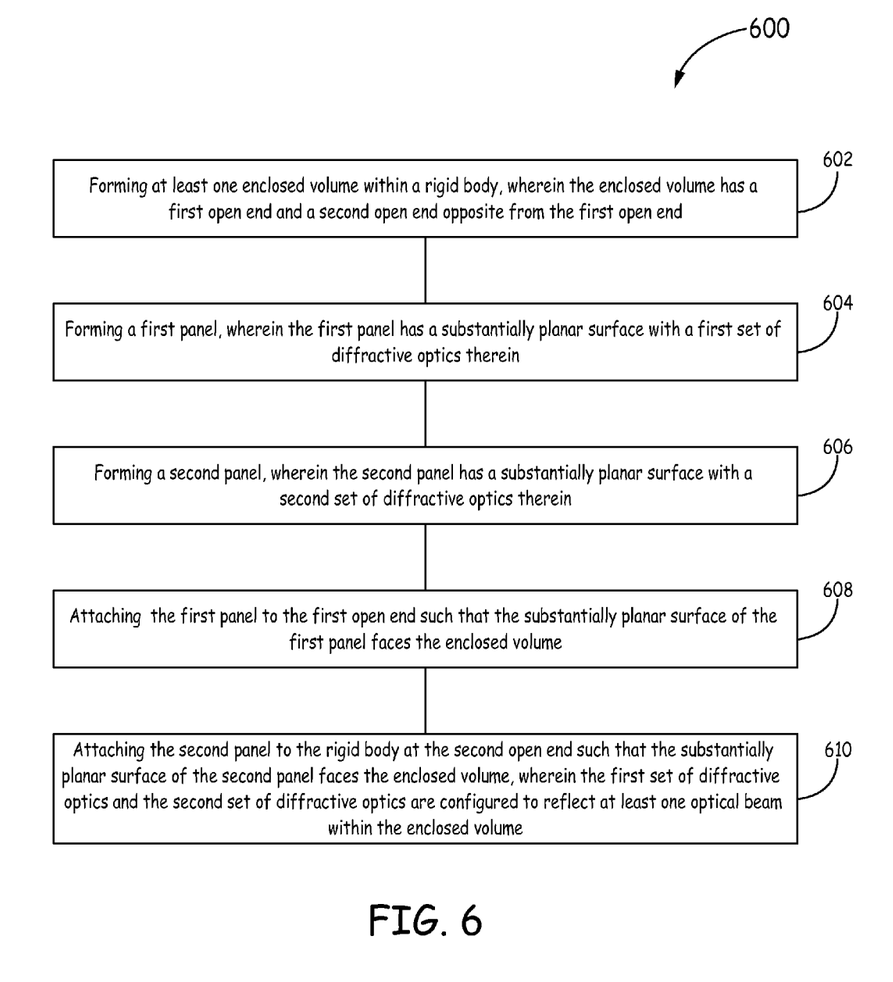
FIG. 6 is a flow diagram illustrating a method for fabricating an atomic sensor according to one embodiment.

FIG. 6 is a flow diagram illustrating a method 600 for fabricating a vacuum cell. Method 600 proceeds at 602, where an enclosed volume is formed within a rigid body, wherein the enclosed volume has a first open end and a second open end opposite from the first open end. For example, an ultrasonic machine tool can form a volume within a silicon wafer by wearing away a portion of the surface of the silicon wafer. Alternatively, the enclosed volume can be formed through deep reactive ion etching in the surface of the silicon wafer.

Method 600 proceeds at 604, where a first panel is formed, wherein the first panel has a substantially planar surface with a first set of diffractive optics therein. Similarly, method 600 proceeds at 606, where a second panel is formed, wherein the second panel has a substantially planar surface with a second set of diffractive optics therein. For example, diffractive optics can be blazed into surfaces of the first and second panels, where the first and second panels are glass wafers.

Method 600 proceeds to 608, where the first panel is attached to the first open end such that the substantially planar surface of the first panel faces the enclosed volume. Further, method 600 proceeds to 610, where the second panel is attached to the second open end such that the substantially planar surface of the second panel faces the enclosed volume, wherein the first set of diffractive optics and the second set of diffractive optics are configured to reflect at least one optical beam within the enclosed volume. For example, the surfaces of both the first panel and the second panel that have the diffractive optics can be bonded to a rigid body made from silicon using anodic bonding, where the first panel and the second panel are bonded to opposite sides of the rigid body. In an alternative embodiment, where the rigid body is fabricated from glass instead of silicon, the first panel and the second panel are bonded to the rigid body using a frit seal. Either the frit seal or the anodic bonding provides an airtight seal for the enclosed volume.

Example Embodiments

Example 1 includes a vacuum cell apparatus for an atomic sensor, the apparatus comprising: a cell wall encircling an enclosed volume, the cell wall having a first open end and a second open end opposite from the first open end; a first panel over the first open end of the cell wall and having a first surface, the first surface facing the enclosed volume and having a first set of diffractive optics therein; and a second panel over the second open end of the cell wall and having a second surface, the second surface facing the enclosed volume and having a second set of diffractive optics therein; wherein the first set of diffractive optics and the second of diffractive optics are configured to reflect at least one optical beam within the enclosed volume along a predetermined optical path.

Example 2 includes the apparatus of Example 1, further comprising one or more light ports configured to communicate the at least one optical beam into the enclosed volume.

Example 3 includes the apparatus of Example 2, wherein the light ports include a first set of light ports that communicate a first set of optical beams into the enclosed volume through the first panel and a second set of light ports that communicate a second set of optical beams into the enclosed volume through the second panel, wherein the first set of optical beams and the second set of optical beams propagate along the optical path within the enclosed volume but in opposite directions.

Example 4 includes the apparatus of any of Examples 1-3, wherein the first set of diffractive optics and the second set of diffractive optics are configured to direct the at least one optical beam at an atom containing location within the enclosed volume.

Example 5 includes the apparatus of Example 4, wherein the at least one optical beam comprises multiple optical beams that orthogonally intersect at the atom containing location.

Example 6 includes the apparatus of any of Examples 4-5, further comprising at least one magnetic coil on an external surface of at least one of the first and second panels, wherein the at least one magnetic coil produces a reduced magnetic field at the atom containing location.

Example 7 includes the apparatus of any of Examples 1-6, wherein the first set of diffractive optics and the second set of diffractive optics includes at least one of: a mirror configured to reflect the at least one optical beam; a collimating optical surface configured to collimate and reflect the at least one optical beam; and a quarter wave plate configured to change the polarization of the at least one optical beam and reflect the at least one optical beam.

Example 8 includes the apparatus of Example 7, wherein the quarter wave plate reflects the at least one optical beam through the enclosed volume such that it propagates back along the optical path.

Example 9 includes the apparatus of any of Examples 1-8, wherein the first panel and the second panel are bonded to the cell wall through at least one of: a frit seal; and an anodic bond.

Example 10 includes the apparatus of any of Examples 1-9, further comprising a first overlayer and a second overlayer, wherein the first overlayer is attached to the first panel and the second overlayer is attached to the second panel.

Example 11 includes the apparatus of Example 10, wherein at least one of the first overlayer and the second layer comprises at least one supplementary magnetic coil.

Example 12 includes a method for fabricating one or more vacuum cells, the method comprising: forming at least one enclosed volume within a rigid body, wherein the at least one enclosed volume has a first open end and a second open end opposite from the first open end; forming a first panel having a first surface and a first set of diffractive optics in the first surface; forming a second panel having a second surface and a second set of diffractive optics in the second surface; attaching the first panel to the rigid body at the first open end such that the first surface faces the at least one enclosed volume; and attaching the second panel to the rigid body at the second open end such that the second surface faces the at least one enclosed volume, wherein the first set of diffractive optics and the second set of diffractive optics are configured to reflect at least one optical beam within the at least one enclosed volume along at least one predetermined optical path.

Example 13 includes the method of Example 12, wherein attaching the first panel and attaching the second panel comprises at least one of: bonding using a frit seal; and bonding using an anodic bonding process.

Example 14 includes the method of any of Examples 12-13, further comprising forming at least one light port configured to communicate the at least one optical beam into the enclosed volume.

Example 15 includes the method of any of Examples 12-14, wherein the first set of diffractive optics and the second set of diffractive optics are configured to direct the at least one optical beam at an at least one atom containing location within the at least one enclosed volume, wherein the at least one optical beam comprises multiple optical beams that orthogonally intersect at the at least one atom containing location.

Example 16 includes the method of Example 15, further comprising forming at least one magnetic coil on an external surface of at least one of the first panel and the second panel, wherein the at least one magnetic coil forms a reduced magnetic field at the at least one atom containing location.

Example 17 includes the method of any of Examples 12-16, further comprising forming a first overlayer and a second overlayer, wherein the first overlayer is attached to the first panel and the second overlayer is attached to the second panel.

Example 18 includes the method of any of Examples 12-17, wherein the one or more vacuum cells are singulated into individual vacuum cells.

Example 19 includes an atomic sensor, comprising: a vacuum cell wall encircling an enclosed volume, the vacuum cell wall having a first open end and a second open end opposite from the first open end; a first panel over the first open end of the vacuum cell wall and having a first internal surface, the first internal surface facing the enclosed volume and having a first set of diffractive optics therein; a second panel over the second open end of the vacuum cell wall and having a second internal surface, the second internal surface facing the enclosed volume and having a second set of diffractive optics therein; one or more light ports configured to communicate at least one optical beam into the enclosed volume, wherein the first set of diffractive optics and the second set of diffractive optics are configured to direct the at least one optical beam at an atom containing location within the enclosed volume along a predetermined optical path; a first overlayer attached to a first external surface of the first panel; and a second overlayer attached to a second external surface of the second panel Example 20 includes the atomic sensor of Example 19, further comprising: at least one magnetic coil on an external surface of at least one of the first and second panels; and at least one supplementary magnetic coil on a surface of at least one of the first overlayer and the second overlayer, wherein the at least one magnetic coil and the at least one supplementary magnetic coil produce a reduced magnetic field at the atom containing location.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A vacuum cell apparatus for an atomic sensor, the apparatus comprising:
   a cell wall surrounding an enclosed volume, the cell wall having a first open end and a second open end opposite from the first open end;
   a first panel bonded to the first open end of the cell wall and having a first surface, the first surface facing the enclosed volume and having a first set of diffractive optics formed within the first panel; and
   a second panel bonded to the second open end of the cell wall and having a second surface, the second surface facing the enclosed volume and having a second set of diffractive optics formed within the second panel;
   wherein the first set of diffractive optics and the second set of diffractive optics are configured to reflect a plurality of optical beams within the enclosed volume along a plurality of optical paths, wherein each optical beam in the plurality of optical beams is introduced into the enclosed volume through one of the first panel and the second panel.

2. The apparatus of claim 1, further comprising one or more light ports configured to communicate the plurality of optical beams into the enclosed volume.

3. The apparatus of claim 2, wherein the light ports include a first set of light ports that communicate a first set of optical beams into the enclosed volume through the first panel and a second set of light ports that communicate a second set of optical beams into the enclosed volume through the second panel, wherein the first set of optical beams and the second set of optical beams propagate along the plurality of optical paths within the enclosed volume but in opposite directions.

4. The apparatus of claim 1, wherein the first set of diffractive optics and the second set of diffractive optics are configured to direct the plurality of optical beams at an atom containing location within the enclosed volume.

5. The apparatus of claim 4, wherein the plurality of optical beams orthogonally intersect at the atom containing location.

6. The apparatus of claim 4, further comprising at least one magnetic coil on an external surface of at least one of the first and second panels, wherein the at least one magnetic coil produces a reduced magnetic field at the atom containing location.

7. The apparatus of claim 1, wherein the first set of diffractive optics and the second set of diffractive optics includes at least one of:
   a mirror configured to reflect the at least one optical beam in the plurality of optical beams;
   a collimating optical surface configured to collimate and reflect the at least one optical beam; and
   a quarter wave plate configured to change the polarization of the at least one optical beam and reflect the at least one optical beam.

8. The apparatus of claim 7, wherein the quarter wave plate reflects the at least one optical beam through the enclosed volume such that it propagates back along an optical path in the plurality of optical paths.

9. The apparatus of claim 1, wherein the first panel and the second panel are bonded to the cell wall through at least one of:
   a fit seal; and
   an anodic bond.

10. The apparatus of claim 1, further comprising a first overlayer and a second overlayer, wherein the first overlayer is attached to the first panel and the second overlayer is attached to the second panel.

11. The apparatus of claim 10, wherein at least one of the first overlayer and the second layer comprises at least one supplementary magnetic coil.

12. A method for fabricating one or more vacuum cells, the method comprising:
   forming at least one enclosed volume within a rigid body, wherein the at least one enclosed volume has a first open end and a second open end opposite from the first open end;
   forming a first panel having a first surface and a first set of diffractive optics in the first surface;
   forming a second panel having a second surface and a second set of diffractive optics in the second surface;
   attaching the first panel to the rigid body at the first open end such that the first surface faces the at least one enclosed volume; and
   attaching the second panel to the rigid body at the second open end such that the second surface faces the at least one enclosed volume, wherein the first set of diffractive optics and the second set of diffractive optics are configured to reflect a plurality of optical beams within the at least one enclosed volume along a plurality of optical paths.

13. The method of claim 12, wherein attaching the first panel and attaching the second panel comprises at least one of:
   bonding using a frit seal; and
   bonding using an anodic bonding process.

14. The method of claim 12, further comprising forming at least one light port configured to communicate at least one optical beam in the plurality of optical beams into the enclosed volume.

15. The method of claim 12, wherein the first set of diffractive optics and the second set of diffractive optics are configured to direct the plurality of optical beams at an at least one atom containing location within the at least one enclosed volume, wherein the plurality of optical beams orthogonally intersect at the at least one atom containing location.

16. The method of claim 15, further comprising forming at least one magnetic coil on an external surface of at least one of the first panel and the second panel, wherein the at least one magnetic coil forms a reduced magnetic field at the at least one atom containing location.

17. The method of claim 12, further comprising forming a first overlayer and a second overlayer, wherein the first overlayer is attached to the first panel and the second overlayer is attached to the second panel.

18. The method of claim 12, wherein the one or more vacuum cells are singulated into individual vacuum cells.

19. An atomic sensor, comprising:
- a vacuum cell wall encircling an enclosed volume, the vacuum cell wall having a first open end and a second open end opposite from the first open end;
- a first panel bonded to the first open end of the vacuum cell wall and having a first internal surface, the first internal surface facing the enclosed volume and having a first set of diffractive optics formed within the first panel;
- a second panel bonded to the second open end of the vacuum cell wall and having a second internal surface, the second internal surface facing the enclosed volume and having a second set of diffractive optics formed within the second panel;
- one or more light ports configured to communicate a plurality of optical beams into the enclosed volume, wherein the first set of diffractive optics and the second set of diffractive optics are configured to direct the plurality of optical beams at an atom containing location within the enclosed volume along a plurality of optical paths;
- a first overlayer attached to a first external surface of the first panel; and
- a second overlayer attached to a second external surface of the second panel.

20. The atomic sensor of claim 19, further comprising:
- at least one magnetic coil on an external surface of at least one of the first and second panels; and
- at least one supplementary magnetic coil on a surface of at least one of the first overlayer and the second overlayer, wherein the at least one magnetic coil and the at least one supplementary magnetic coil produce a reduced magnetic field at the atom containing location.

* * * * *